UNITED STATES PATENT OFFICE.

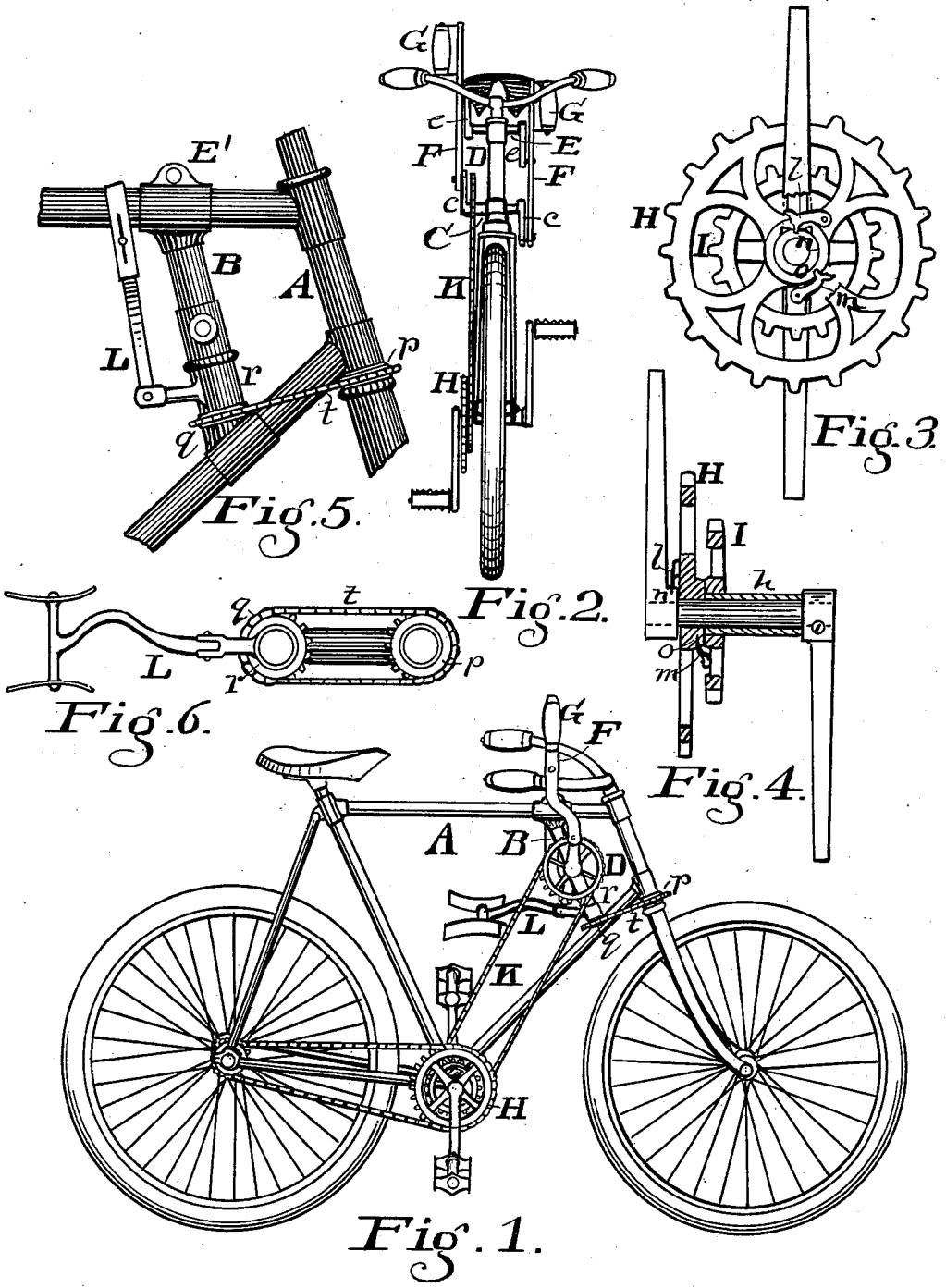

VICTOR ERNST, OF CLEVELAND, OHIO.

BICYCLE.

SPECIFICATION forming part of Letters Patent No. 593,975, dated November 16, 1897.

Application filed July 19, 1897. Serial No. 645,165. (No model.)

*To all whom it may concern:*

Be it known that I, VICTOR ERNST, a citizen of the United States, residing at Cleveland, in the county of Cuyahoga and State of Ohio, have invented certain new and useful Improvements in Bicycles, of which the following is a specification.

This invention relates to bicycles, and has for its object to provide a means whereby a rider may propel the bicycle by the use of the hands and arms, as well as by the use of the feet and legs, or may change from the one method to the other, as occasion may require, thus enabling the rider to change from the foot-power for propulsion to the hand-power, or vice versa, thereby giving relief to the lower limbs or the upper limbs by their alternate use.

The invention consists of the additional hand propelling mechanism in combination with the foot-treadle mechanism, substantially as hereinafter described, and pointed out in the claims.

In the accompanying drawings, Figure 1 is a side elevation of a bicycle having my improvement attached. Fig. 2 is a front elevation of the same. Fig. 3 is an enlarged side view of the foot-treadle sprocket-wheel and an additional sprocket loosely mounted on the treadle-shaft, showing the means provided for their rotating together or separately, as may be required. Fig. 4 is a vertical cross-section of the same. Fig. 5 is an enlarged side elevation of a knee guiding mechanism to be used when the hand propelling mechanism is used. Fig. 6 is a top or plan view of the same.

A represents the usual diamond frame of a bicycle. In fact, the whole machine is like those now in common use.

B is an additional brace-bar across from the upper to the lower diagonal bar of the frame, situated a short distance back of the handle-bars. This is provided for the support of a short shaft C, having cranks $c\ c$ and carrying a sprocket-wheel D.

E is also a short shaft supported in a bearing E' on the top bar of the frame. It also has cranks $e\ e$.

F F are hand-levers connecting the cranks $c$ and $e$ on each side of the frame. They extend upward to a convenient height between the ordinary handle-bars of the machine and are provided with hand-grips G G.

The treadle-shaft and bearings are made somewhat different from those now in use to provide for not rotating said shaft when the hand propelling mechanism is used and allow the treadles to be used as foot-rests and also provide for permitting the treadles to be used for propelling when the hands are not used for that purpose. To accomplish this, the treadle-sprocket H is loosely mounted on the shaft, but may be locked or latched to it when desired. I is a second sprocket having a long sleeve-hub $h$, also loosely mounted on said treadle-shaft, and which may also be locked or latched to the said sprocket H when required. K is a chain belt connecting the upper sprocket D and sprocket I. $l$ is a latch pivoted to one of the spokes of the treadle-sprocket, which is turned down to catch in a notch $n$ in the hub of the treadle-lever which is fast on the shaft on that side of the machine. $m$ is also a similar latch pivoted to the sprocket I, which is turned to catch in a notch $o$ in the hub of sprocket H.

The left-hand treadle-lever is clamped on the shaft so that it may be loosened, turned, and again fastened on a line parallel with the right hand for the purpose of adjusting them on the same line when they are to be used for foot-rests.

From the foregoing it will be seen that the change from foot to hand power propulsion is readily accomplished as follows: In propelling by foot-power the hand-power mechanism is disengaged from the other by simply unlatching the sprocket I from sprocket H. When the change is to be made, said sprocket I is latched to the sprocket H, and the sprocket H is unlatched from the foot-lever. This gives freedom for the two sprockets to turn on the shaft. Then the treadles are adjusted to serve as foot-rests. The machine is now ready for the application of the hand-power. When the rider mounts, the knee steering-lever is required for guiding the machine. This consists of a sprocket $p$ on the head of the fork and a sprocket $q$ on a loose sleeve $r$ on the brace B, connected by a drive-chain $t$. Attached to the sleeve $r$ is a jointed lever L, having knee pressure-arms extending back between the legs of the rider. The rider grasps the hand-grips G G and operates the levers F F by a rotative movement of the hands and arms and transmits motion through the drive-chain K to the sprocket I, thence to the sprocket H, from whence motion is transmitted for propelling the machine, the same as by the foot-power.

Having described my invention, I claim—

1. In a bicycle, the combination with a main frame having wheels, a crank-shaft with foot-pedals, sprockets upon the crank-shaft and main axle, respectively, and connected by a drive-chain; of the additional brace B in the main frame, a crank-shaft C journaled to said brace, a crank-shaft E journaled at E' on the main frame, hand-levers F F connecting said crank-shafts C and E, at each side of the frame, respectively, a sprocket D mounted on shaft C, a corresponding sprocket I loosely mounted on the treadle-shaft, drive-chain K connecting said sprockets D and I, sprocket H also loosely mounted on the treadle-shaft, latch $l$ on sprocket H, and a latch $m$ on sprocket I, whereby said sprocket H may be rotated by the sprocket I on the treadle-shaft independently of the treadles, for propelling the bicycle by the hand-power movement, substantially as described.

2. In a bicycle, a knee steering device consisting of sleeve $q$ and sprocket $r$ loosely mounted on brace B, sprocket $p$ mounted on steering-fork head, chain $t$ connecting said sprockets, a jointed knee-lever L attached to said sleeve $r$, adapted to operate substantially as described.

VICTOR ERNST.

Witnesses:
GEO. W. TIBBITTS,
R. H. HUSBANDS.